United States Patent [19]
Gibbons, Jr. et al.

[11] Patent Number: 5,022,307
[45] Date of Patent: Jun. 11, 1991

[54] LIGHT WEIGHT ATTENUATOR OF BLAST AND SHOCK FROM DETONATING MUNITIONS

[75] Inventors: Gould Gibbons, Jr., Finksburg; Jerry L. Watson, Darlington; William Lawrence, Edgewood, all of Md.

[73] Assignee: The United States of America as represented by the Secretary of the Army, Washington, D.C.

[21] Appl. No.: 449,207

[22] Filed: Dec. 12, 1989

[51] Int. Cl.$^5$ .............................. F41H 5/04; F41H 5/16
[52] U.S. Cl. .................................. 89/36.02; 89/36.08; 89/34
[58] Field of Search ................. 89/36.02, 36.04, 36.08, 89/34; 109/49.5, 82, 84; 428/911

[56] References Cited

U.S. PATENT DOCUMENTS

| | | | |
|---|---|---|---|
| 1,270,343 | 6/1918 | Szmyt | 109/82 |
| 1,602,870 | 10/1926 | Villiers | 89/36.02 |
| 3,604,374 | 9/1971 | Matson | 89/36.02 |
| 3,633,520 | 1/1972 | Stiglich, Jr. | 109/82 |
| 3,804,034 | 4/1974 | Stiglich, Jr. | 109/80 |
| 4,198,454 | 4/1980 | Norton | 428/117 |
| 4,404,889 | 9/1983 | Miguel | 89/36.02 |
| 4,484,678 | 11/1984 | Walker et al. | 206/3 |
| 4,529,640 | 7/1985 | Brown et al. | 89/36.02 |
| 4,566,237 | 1/1986 | Turner | 428/911 |
| 4,574,105 | 3/1986 | Donovan | 428/233 |
| 4,768,418 | 9/1988 | Blommer et al. | 89/34 |

FOREIGN PATENT DOCUMENTS

| | | | |
|---|---|---|---|
| 550204 | 12/1959 | Belgium | 89/36.02 |
| 493168 | 8/1919 | France | 89/36.02 |
| 2041178 | 9/1980 | United Kingdom | 89/36.02 |

OTHER PUBLICATIONS

English Translation of Martin (French Patent No. 493,168 published on 8/1/19).
Duponts KEVLAR aramid 11/22/82, entire disclosure.

Primary Examiner—Deborah L. Kyle
Assistant Examiner—Stephen Johnson
Attorney, Agent, or Firm—Saul Elbaum; Freda L. Krosnick

[57] ABSTRACT

A composite, layered shield for protecting a vehicle housing explosives in an ammunition stowage compartment from the detonation of said explosives while in said compartment. Said shield comprises, in a layered fashion, a first layer of an energy absorbing rubber, a pusher plate layer, a crush element layer, and a second layer of an energy absorbing rubber. In order to protect the vehicle, the ammunition stowage compartment is lined with the composite, layered shield of the present invention. The shield is mounted in such a manner that the energy absorbing rubber is closest to the explosives, followed by the pusher plate, then the crush element, and finally the second energy absorbing rubber layer. The overall areal density of the shield is about 17.6 pounds per square foot. Said shield is light weight and provides effective blast and shock protection for the walls of the explosive containing stowage compartment as well as for the vehicle housing the stowage compartment.

17 Claims, 2 Drawing Sheets

LIGHT WEIGHT ATTENUATOR OF BLAST AND SHOCK FROM DETONATING MUNITIONS

GOVERNMENTAL INTEREST

The invention described herein may be manufactured, used and licensed by or for the U.S. Government for governmental purposes without the payment to us of any royalties thereon.

BACKGROUND OF THE INVENTION

Combat vehicles often house high explosive munitions. The safe housing of said munitions is critical to the well being of the transport personnel and their vehicles. Hence, the housing of the high explosives in transport vehicles and the protection of the vehicles carrying them in the event of the explosive's detonation while within the vehicle is of great concern. The problem of housing and transporting explosives is not a novel one, however, it does remain a difficult one to solve.

Housing and transporting these munitions is a dangerous task; and is dangerous even when the transport vehicle used is a battle tank. The problem, however, is magnified when the transport vehicle structure is composed primarily of aluminum.

External or compartmentalized storage of the explosive munitions is a viable solution to the problem. However, such storage would only be successful in overcoming the difficulties mentioned above only if the vehicle is able to withstand the blast from the detonation of the stowed munition.

Layered, composite armor plates have been used to protect military vehicles from explosive blasts. For example, U.S. Pat. No. 4,404,889, issued to Miguel, teaches a hybrid, layered, composite floor armor for use in military tanks. The armor of Miguel exists in a sandwiched configuration and may contain steel honeycomb, Kevlar ® and balsa wood. The claims in Miguel require the presence of balsa wood. Although the present invention does make use of Kevlar ®, the use of balsa wood is nowhere mentioned.

Miguel further teaches an armor that has an areal density of 63 lbs./sq.ft. The armor of the present invention is focused on weight efficiency. Our invention has an areal density substantially lower than that claimed in Miguel. For example, the areal density of the present invention is more in the range of 17.6 lbs./sq.ft. Our armor is light weight and is used for protection of light weight structures, not tanks. The honeycomb high strength/high density steel material used by Miguel has a density of 0.70 grams/cubic centimeter; whereas, the honeycomb crush element used herein has a density of approximately 0.13 grams/cubic centimeter. The comparative material used in Miguel is almost six-fold more dense than the material used herein. Moreover, the present invention uses a pusher plate which acts in a piston-like fashion against the honeycomb crush element. This combination is neither taught nor suggested by Miguel.

U.S. Pat. No. 4,198,454, issued to Norton, teaches a lightweight composite, layered panel for resisting penetration of explosives. Said panel requires the presence of thermal insulation and a honeycomb panel which contains a subliming material. The present invention does not require the presence of said components.

U.S. Pat. No. 4,574,105, issued to Donovan, teaches penetration resistant panels which comprise textile yarns and Kevlar ®. The ballistic protective device of Donovan does not use Nomex ® honeycomb, aluminum honeycomb, homogeneous armor, glass-filled resinous sheet materials, etc. These materials are all within the scope of the present invention.

U.S. Pat. Nos. 3,804,034 and 3,633,520 teach the general concept of layered armor. These references do not teach or suggest the parameters of the present invention. They further do not teach the utility claimed herein.

To date, a light weight attenuator of blast and shock from detonating munitions comprising the composite, layered shield of the present invention has not been proposed. Moreover, the use of said light weight shield for the purposes set forth herein is novel.

BRIEF SUMMARY OF THE INVENTION

The invention is directed to a multi-layered composite material which is bonded together to form a light weight shield. This invention, more specifically, deals with a composite, layered shield comprising a first layer of an energy absorbing rubber; a pusher plate layer; a crush element layer; and, finally, a second layer of an energy absorbing rubber. The shield of the present invention operates in a fashion such that when a munition detonates, the blast impacts onto the energy absorbing rubber; the pusher plate then disperses the reaction pressure; and pushes an imprint resulting from the detonation onto the crush element layer.

In contrast to most composite armor shields already in the market place, the shield of the present invention is light weight. Because of this characteristic, the shield may be used in a broader scope of vehicles for their protection. The shield may be applied to the interior body of heavy military vehicles, such as tanks, as well as to light vehicles which may be constructed primarily out of aluminum.

The composite armor shield of the present invention is able to provide to a surface, or vehicle, effective blast and shock protection from the detonation of explosives. The shield of the invention is intended for use as an "isolation package," as opposed to an "armor." The invention prevents or masks the ill effects that explosives within its confines may have on the environment outside its confine. For example, the composite, layered shield may be used to line ammunition stowage compartments of military transport vehicles. Using the shield in this manner protects both the operators of the vehicle and the transport vehicle from injury or damage due to the internal detonation of ammunition located within said ammunition stowage compartments. The shield of the invention is able to attenuate the blast and shock of the detonating munition. When used in this manner, the energy absorbing rubber layer is closest to the explosive, followed by the pusher plate layer, then the crush element layer, and finally the second energy absorbing rubber layer.

Accordingly it is an object of the present invention to provide a lining for an ammunition stowage compartment which is able to attenuate the blast and shock from a detonating munition therein.

Another object of the present invention is to provide a strong, light-weight, composite, layered shield.

Still another object of the present invention is to provide a layered shield which may be applied to any light weight munition stowage compartment.

Other objectives and features of the present invention will be apparent from the following detailed description of the invention and claims.

DETAILED DESCRIPTION OF INVENTION

The invention herein is a composite, layered shield comprising a first layer of an energy absorbing rubber; a pusher plate layer; a crush element layer; and a second layer of an energy absorbing rubber. The component parts of said composite, layered shield make use of well-known, commercially available materials. The invention does not reside in the individual components of the shield per se. Rather it resides in the combination of particular materials and the use of the resulting shield.

The first and second layer of energy absorbing rubber may be made up of Isodamp ® C-1002, manufactured by E.A.R. Division of Cabot Corporation, Indianapolis, Ind. Isodamp ® C-1002 is a proprietary trade name for an energy absorbing thermoplastic alloy. It has good physical strength, flexibility and non-skid properties.

The crush element layer may be composed of a Nomex ® honeycomb bonded to Kevlar ® rigid sheet stock or an aluminum honeycomb material. The sheet stock has a density of about 0.13 g/cc and may be obtained from Advanced Technology & Research, Inc. of Largo, Fla. Nomex ® is a proprietary trade name for a special nylon fiber. Kevlar ® is a proprietary trade name for a strong organic fiber used to weave a tough flexible fabric. Kevlar ® is often referred to as ballistic cloth; and is often used in the manufacture of bullet proof vests. Chemically, it is an aromatic polyamide material of the nylon class.

The pusher plate layer of the present invention serves to disperse the force of the detonating munition over a large area. Said pusher plate may be composed of Kevlar ®, rolled homogeneous armor or glass-filled resinous sheet materials. Kevlar ®, the proprietary material described above, is made available by E.I. Dupont De Nemours & Co., Wilmington, Del. The pusher plate may be steel or aluminum. For example, RHA (rolled homogeneous armor) may be used. RHA is a common steel armor used by the U.S. Military; its Mil. Spec. is Mil-S-13812B. Any rigid, strong, resilient, and somewhat ductile plate may be considered for application as the pusher plate layer herein.

The specific materials set forth above are merely representative of the materials which may be used in the shield of the present invention. Materials having the same or similar properties to those specifically identified may be used. It is obvious to one skilled in the art as to the obvious changes and modifications which may be made without departing from the invention.

The individual layer components of the present invention, as stated above, are well-known materials. They may or may not be bonded to one another; however, in the event that the materials are bonded, any conventional bonding technique may be used. For example, one may use suitable adhesives to serve the purpose. An additional method of bonding said layers to one another might be using a thermosetting resin in a heat curing process. Another possible bonding technique may be to encapsulate the entire shield in a thermoplastic material, such as Isodamp ® C-1002 (a proprietary trade name, energy absorbing thermoplastic alloy having good physical strength, flexibility and non-skid properties) manufactured by E.A.R. Division of Cabot Corporation of Indianapolis, Ind. There is no criticality as to whether the shield of the invention is bonded or not. Moreover, the method of accomplishing any bonding of the individual component layers is further not critical to the present invention.

The thickness of the individual layer components of the shield herein depends upon the structure to be protected and the explosive type which may detonate. One skilled in the art of shields would be able to determine the necessary thickness of each component layer herein in order to maximize the shields effect. The following parameters are merely illustrative of the thickness of the shields' layer components which fall within the scope of the present invention: The thickness of each energy absorbing rubber layer may range from about 12 mm to about 25 mm. The thickness of the pusher plate layer may range from about 6 mm to about 19 mm. And, the thickness of the crush element layer may range from about 19 mm to about 75 mm. There is no requirement for specific material densities or weight; however, differences in densities between the layers is important. Differing material densities between the layers provide a mismatch of shock impedance. Due to this impedance mismatch, transmission of detonation shock is thoroughly dispersed and mitigated. Moreover, the complete shield weight is also an important feature of the present invention. The lighter the shield, the better.

The shield is designed to function in a desired environment with as little mass as possible. The specific structure to be protected and the type of explosive to be protected from dictate the specific design of the shield—i.e., thickness and weight of the shield. For example, aluminum, when shock loaded by a detonating high explosive warhead, shatters in a glass-like fashion. The use of the shield of the present invention may be constructed in a manner which would prevent such an effect on light weight metals, such as aluminum.

This invention is able to provide light weight, effective blast and shock protection for the walls of an aluminum ammunition stowage compartment found on or within a light weight fighting vehicle 22. The compartment, to be useful, must vent in a controlled fashion to the outside, away from personnel and other components. This invention may be applied to any light weight, stowage compartment in which the blast and shock from a detonating munition located within said compartment must be attenuated. For example, the invention would be able to attenuate the effects of a basic TOW warhead detonating alongside a 25.4 mm thick aluminum plate. A basic TOW warhead is merely an example of a high explosive. A TOW warhead contains approximately 5.3 pounds of Octol (composition comprising about 70-75% by wt. HMX [cyclotetramethylene tetranitramine] and about 25-30% by wt. TNT [trinitrotoluene]). The most common and commercially available Octol comprises 75% by wt. HMX and 25% by wt. TNT.

The shield of the present invention may be affixed to the walls of an ammunition stowage compartment by any conventional means. For instance, it may be bonded to the walls using an effective adhesive; it may be held in place using straps; or it may even be bolted to the compartment structure. The shield may even be used as an ammunition rack. See FIGS. 2 and 3 which set forth this embodiment.

The shield of the invention is mounted in a manner such that the layers of the shield closest to the munitions which may detonate are in the following order: (1) an energy absorbing rubber layer, followed by (2) a pusher plate layer, followed by (3) a crush element layer, and finally (4) a second energy absorbing rubber layer. Final layer (4) is the layer mounted directly onto the structure to be protected from detonating munitions.

For a further explanation of the invention reference should be made to the discussion below with regard to the accompanying drawings and the embodiment disclosed.

BRIEF DESCRIPTION OF THE DRAWINGS

The preferred embodiments of the present invention will be described with reference to the accompanying drawings.

DETAILED DESCRIPTION OF THE DRAWINGS

Figure 1:
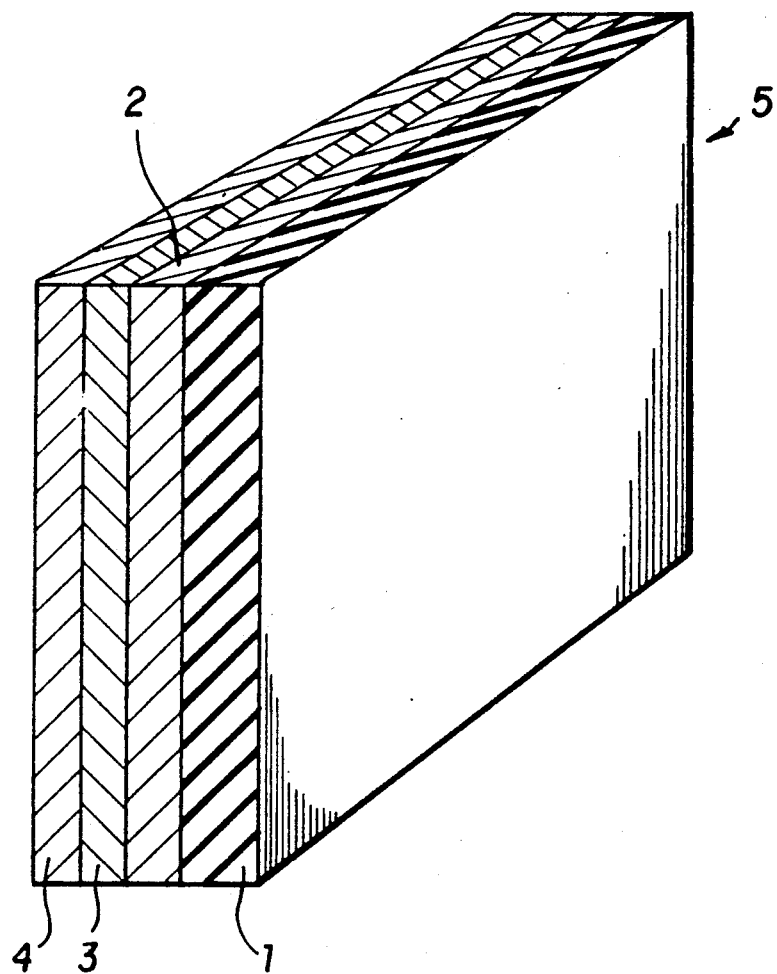
FIG. 1 is a perspective view of the multi-layered composite shield of the present invention.

FIG. 1 illustrates an embodiment of the multi-layered composite shield within the scope of this invention. It illustrates a perspective view of said shield. The shield is set forth, generally, as 5. Note that said shield is in a sandwiched configuration having four distinct layers 1, 2, 3, and 4. Both outer layers, 1 and 4, are composed of an energy absorbing rubber (E.A.R.), such as Isodamp® C-1002. Layer 2 is referred to herein as the crush element (CE). Materials which may be used for the CE 2 have chemical and physical characteristics such as the Nomex® bonded to Kevlar® rigid sheet stock, which is obtained from Advanced Technology & Research, Inc. of Largo, Fla. The pusher plate 3 may be composed of any rigid, strong, resilient, and somewhat ductile material. Kevlar®, rolled homogeneous armor, or glass-filled resinous sheet materials may be used for said pusher plate 3. The multi-layered shield 5 described may be applied in sheet form to the interior walls of an ammunition stowage compartment 21.

Figure 2:
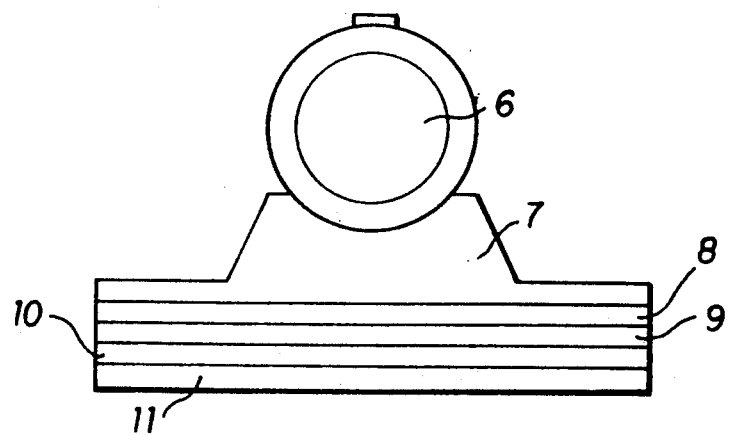
FIG. 2 is an end view of the multi-layered composite shield of the present invention in actual use.

FIG. 2 illustrates the shield of the present invention in one of its many actual uses. The shield of the invention comprises outer layers 7 and 10, pusher plate 8, and crush element 9. The shield in this embodiment can be seen attached to interior wall 11 of an ammunition stowage compartment. The shield may be molded in such a manner so as to be equipped to cradle a munition, such as missile 6. Note that outer layer 7, herein, is molded in such a manner so as to accomodate the storage of missile 6. In the molded, unitized package shield, layers 7 and 10 may be applied together during the molding process. Said layers 7 and 10 may, optionally, encapsulate the other component layers, 8 and 9.

Figure 3:
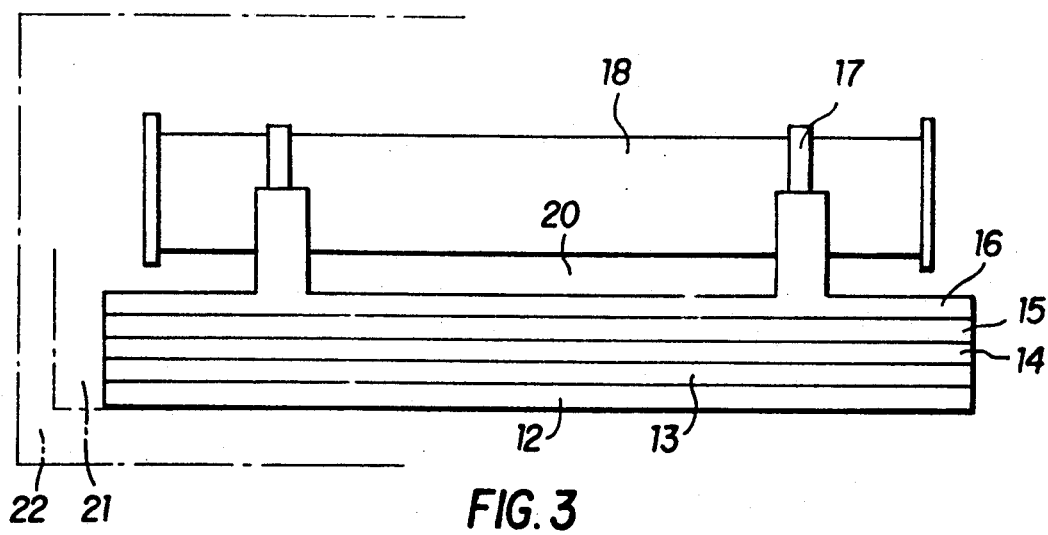
FIG. 3 is a side view of FIG. 2.

FIG. 3 illustrates a side view of the embodiment set forth in FIG. 2, above. The interior wall of the ammunition stowage compartment is represented by reference 12. The shield includes an energy absorbing rubber 13, a crush element 14, a pusher plate 15, and a molded energy absorbing rubber layer 16. Note that the molded energy absorbing layer 16 is molded so as to accomodate and cradle missile 18. Again, layers 13 and 16 may be applied together in the molding process. Missile 18 may be held in place to the shield by the use of straps 17. The missile 18 should not be completely surrounded by the shield. An air space 20 may be present between missile 18 and the molded energy absorbing rubber layer 16.

The embodiments set forth in the figures are merely illustrative of the multi-layered, composite shield of the present invention. It will be obvious to those skilled in the art that changes and modifications may be made to the shield without departing from the spirit of this invention.

SPECIFIC EMBODIMENT

Example

A multi-layered, composite shield was built having the following parameters:

| Layer | Type of Layer | Material Used | Thickness | Density |
| --- | --- | --- | --- | --- |
| 1 | Energy Absorbing | Isodamp® | 12.7 mm | 1.3 g/cc |
| 2 | Pusher Plate | Rolled Armor | 6.4 mm | 7.88 g/cc |
| 3 | Crush Element | Nomex®/ Kevlar® | 19.1 mm | 0.13 g/cc |
| 4 | Energy Absorbing | Isodamp® | 12.7 mm | 1.3 g/cc |

The multi-layered, composite shield set forth above was designed to protect a sheet of aluminum having a thickness of 25.4 mm from the detonation of a basic TOW missile warhead. The total thickness of the shield of this example (including air space) is merely 70.0 mm (2.75 inches). Its areal density is about 17.6 lbs. per square foot.

The distance between the basic TOW missile warhead and the shield was 19.1 mm. Air occupied the 19.1 mm space.

Using the shield set forth above, the aluminum plate did not break or shatter. If the shield had not been used, the aluminum sheet would have shattered even if the basic TOW missile was 254 mm (10 inches) away from the unprotected aluminum plate. FIGS. 2 and 3 represent the manner in which the missile was cradled and set-up using the shield.

While particular embodiments of the present invention have been shown and described, it will be obvious to those skilled in the art that changes and modifications may be made without departing from this invention. Therefore, it is intended that the claims herein are to include all such obvious changes and modifications as fall within the true spirit and scope of this invention.

We claim:

1. A light weight composite shield for protecting the walls of an ammunition stowage compartment, wherein said shield is in a layered, sandwich configuration comprising
   a first layer of energy absorbing rubber;
   followed by a pusher plate layer;
   a crush element layer; and
   a second layer of energy absorbing rubber wherein said pusher plate layer is composed of Kevlar®.

2. A method for protecting a vehicle housing explosives in an ammunition stowage compartment from damage due to detonation of said explosives within said vehicle comprising lining the walls of said ammunition stowage compartment within said vehicle with an effective amount of a light weight composite shield comprising
   a first layer of energy absorbing rubber;
   followed by a pusher plate layer;
   a crush followed then by element layer; and then
   a second layer of energy absorbing rubber; said shield having a layered, sandwiched configuration.

3. A method in accordance with claim 2, wherein said energy absorbing rubber is composed of C-1002 Isodamp®.

4. A method in accordance with claim 2, wherein the overall areal density of the light weight composite shield is about 17.6 pounds per square foot.

5. A light weight composite shield for protecting the walls of an ammunition stowage compartment, wherein said shield is in a layered, sandwich configuration comprising
   a first layer of energy absorbing rubber;
   a pusher plate layer;
   a crush element layer; and
   a second layer of energy absorbing rubber, wherein the crush element layer is composed of Nomex® honeycomb bonded to Kevlar®.

6. A light weight composite shield for protecting the walls of an ammunition stowage compartment, wherein said shield is in a layered, sandwich configuration comprising
   a first layer of energy absorbing rubber;
   a pusher plate layer;
   a crush element layer; and
   a second layer of energy absorbing rubber, wherein the overall areal density of the light weight composite shield is about 17.6 pounds per square foot.

7. A method for protecting a vehicle housing explosives in an ammunition stowage compartment from damage due to detonation of said explosives within said vehicle comprising lining the walls of said ammunition stowage compartment within said vehicle with an effective amount of a light weight composite shield comprising
   a first layer of energy absorbing rubber;
   a pusher plate layer;
   a crush element layer; and
   a second layer of energy absorbing rubber; said shield having a layered, sandwiched configuration, and wherein the crush element layer is composed of Nomex® honeycomb bonded to Kevlar®.

8. A method for protecting a vehicle housing explosives in an ammunition stowage compartment from damage due to detonation of said explosives within said vehicle comprising lining the walls of said ammunition stowage compartment within said vehicle with an effective amount of a light weight composite shield comprising
   a first layer of energy absorbing rubber;
   a pusher plate layer;
   a crush element layer; and
   a second layer of energy absorbing rubber; said shield having a layered, sandwiched configuration, and wherein the overall areal density of the light weight composite shield is about 17.6 pounds per square foot.

9. A light weight composite shield for protecting the walls of an ammunition stowage compartment, wherein said shield is in a layered, sandwich configuration comprising
   a first layer of energy absorbing rubber;
   followed by a pusher plate layer;
   followed then by a crush element layer; and then
   a second layer of energy absorbing rubber, wherein said pusher plate layer is composed of rolled homogeneous armor.

10. A light weight composite shield for protecting the walls of an ammunition stowage compartment, wherein said shield is in a layered, sandwich configuration comprising
    a first layer of energy absorbing rubber;
    followed by a pusher plate layer;
    followed then by a crush element layer; and then
    a second layer of energy absorbing rubber, wherein said pusher plate layer is composed of glass-filled resinous sheet materials.

11. A light weight composite shield for protecting the walls of an ammunition stowage compartment, wherein said shield is in a layered, sandwich configuration comprising
    a first layer of energy absorbing rubber;
    followed by a pusher plate layer;
    followed then by a crush element layer; and then
    a second layer of energy absorbing rubber, wherein said pusher plate layer is composed of mild steel.

12. A light weight composite shield for protecting the walls of an ammunition stowage compartment, wherein said shield is in a layered, sandwich configuration comprising
    a first layer of energy absorbing rubber;
    followed by a pusher plate layer;
    followed then by a crush element layer; and then
    a second layer of energy absorbing rubber, wherein said pusher plate layer is composed of aluminum.

13. A light weight composite shield for protecting the walls of an ammunition stowage compartment, wherein said shield is in a layered, sandwich configuration comprising
    a first layer of energy absorbing rubber;
    followed by a pusher plate layer;
    followed then by a crush element layer; and then
    a second layer of energy absorbing rubber, wherein said crush element layer is composed of Nomex® honeycomb bonded to Kevlar®.

14. The shield in accordance with claim 13, wherein said Nomex® honeycomb bonded to Kevlar® crush element layer has a density of about 0.13 grams per cubic centimeter.

15. A light weight composite shield for protecting the walls of an ammunition stowage compartment, wherein said shield is in a layered, sandwich configuration comprising
    a first layer of energy absorbing rubber;
    followed by a pusher plate layer;
    followed then by a crush element layer; and then
    a second layer of energy absorbing rubber, wherein said crush element layer is composed of aluminum honeycomb.

16. A light weight composite shield for protecting the walls of an ammunition stowage compartment, wherein said shield is in a layered, sandwich configuration comprising
    a first layer of energy absorbing rubber;
    a pusher plate layer;
    a crush element layer; and
    a second layer of energy absorbing rubber, wherein the crush element layer is composed of aluminum honeycomb.

17. A method for protecting a vehicle housing explosives in an ammunition stowage compartment from damage due to detonation of said explosives within said vehicle comprising lining the walls of said ammunition stowage compartment within said vehicle with an effective amount of a light weight composite shield comprising
    a first layer of energy absorbing rubber;
    a pusher plate layer;
    a crush element layer; and
    a second layer of energy absorbing rubber; said shield having a layered, sandwiched configuration, and wherein the crush element layer is composed of aluminum honeycomb.

* * * * *